(12) United States Patent
Lee et al.

(10) Patent No.: US 8,320,753 B2
(45) Date of Patent: Nov. 27, 2012

(54) HANDSHAKE CORRECTION APPARATUS

(75) Inventors: Kyung-bae Lee, Suwon-si (KR);
Kwang-seok Byon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/720,879

(22) Filed: Mar. 10, 2010

(65) Prior Publication Data
US 2010/0239237 A1 Sep. 23, 2010

(30) Foreign Application Priority Data
Mar. 17, 2009 (KR) .................. 10-2009-0022758

(51) Int. Cl.
*G03B 17/00* (2006.01)
(52) U.S. Cl. .................................... 396/55; 348/208.11
(58) Field of Classification Search .............. 396/55; 348/208.11
See application file for complete search history.

(56) References Cited

U.S. PATENT DOCUMENTS

| | | | |
|---|---|---|---|
| 7,539,404 B2 * | 5/2009 | Iwasaki et al. ............... | 396/55 |
| 7,630,619 B2 * | 12/2009 | Masuda ...................... | 396/55 |
| 2006/0064884 A1 * | 3/2006 | Seo ............................ | 33/1 M |
| 2007/0183764 A1 * | 8/2007 | Imura et al. ................. | 396/55 |
| 2007/0196085 A1 * | 8/2007 | Enomoto ..................... | 396/55 |
| 2009/0045807 A1 * | 2/2009 | Nishida et al. .............. | 324/207.2 |
| 2009/0115409 A1 * | 5/2009 | Arinaga et al. ............. | 324/207.25 |
| 2009/0128637 A1 * | 5/2009 | Noji ........................... | 348/208.1 |
| 2009/0201017 A1 * | 8/2009 | Peev et al. .................. | 324/251 |
| 2009/0252484 A1 * | 10/2009 | Hasuda ...................... | 396/55 |
| 2009/0252488 A1 * | 10/2009 | Eromaki et al. ............. | 396/529 |
| 2009/0254288 A1 * | 10/2009 | Chase et al. ................. | 702/42 |
| 2010/0165126 A1 * | 7/2010 | Uenaka ....................... | 348/208.4 |
| 2010/0166401 A1 * | 7/2010 | Akutsu ....................... | 396/55 |
| 2011/0026908 A1 * | 2/2011 | Nishimura .................. | 396/55 |

* cited by examiner

*Primary Examiner* — Christ Mahoney
*Assistant Examiner* — Linda B Smith
(74) *Attorney, Agent, or Firm* — Drinker Biddle & Reath LLP

(57) ABSTRACT

A handshake correction apparatus for correcting shake of a camera includes Hall sensors that detect current position of a correction lens. The Hall sensors include a pair disposed along a virtual extension line crossing a correction lens. The apparatus also includes an actuator that drives the correction lens in response to a control signal calculated according to the current position and a target position of the correction lens.

14 Claims, 9 Drawing Sheets

HANDSHAKE CORRECTION APPARATUS

CROSS-REFERENCE TO RELATED PATENT APPLICATION

This application claims the priority benefit of Korean Patent Application No. 10-2009-0022758, filed on Mar. 17, 2009, in the Korean Intellectual Property Office, the disclosure of which is incorporated herein in its entirety by reference.

BACKGROUND

1. Field of the Invention

The present invention relates to a handshake correction apparatus, and more particularly, to a handshake correction apparatus for correcting an image shake caused by handshake.

2. Description of the Related Art

A digital camera captures an image of a subject, converts the image into image data, and records the image data into an appropriate file format. If the captured image is affected by handshake or external vibration, the captured image may be blurred, thus having low quality.

Recently, various image stabilization methods have been developed to automatically correct shake of a camera. For example, in one of the proposed methods, an optical lens is driven and controlled to move in a direction by an appropriate movement amount corresponding to a shake amount of the camera, thereby fixing an image-forming position on an image sensor. To be more specific, a target position of the optical lens may be calculated according to the shake of the camera and then a correction operation may be performed via a feed-back control according to a difference signal between the target position and a current position of the optical lens. In this regard, a Hall sensor is mounted in the camera so as to detect the positions of the optical lens. However, a detection error of the Hall sensor directly affects a control performance of the correction operation and, eventually, causes deterioration of the control performance.

SUMMARY

A handshake correction apparatus, according to an embodiment of the present invention, reduces an error of a position sensing operation for shake correction that does not require re-designing an output signal processing circuit and a wiring.

According to an aspect of the present invention, a handshake correction apparatus for correcting a shake of a camera includes Hall sensors that detect current position of a correction lens, the Hall sensors including a pair disposed along a virtual extension line crossing a correction lens, and an actuator that drives the correction lens in response to a control signal calculated according to the current position and a target position of the correction lens.

The Hall sensors may include a first Hall sensor that detects a displacement of the correction lens in a first axis direction, and second Hall sensors disposed as a pair along the virtual extension line and that detect a displacement of the correction lens in a second axis direction.

A distance between the second Hall sensors and a center of the correction lens may be greater than a distance between the first Hall sensor and the center of the correction lens.

Output terminals having the same polarity of the second Hall sensors may be connected in parallel. Alternately, output terminals having different polarities of the second Hall sensors may be connected in series.

The handshake correction apparatus may further include a first magnet disposed to face the first Hall sensor, wherein polarity of the first magnet is reversed in the first axis direction, and a pair of second magnets disposed to face the second Hall sensors, wherein polarities of the second magnets are reversed in the second axis direction.

The actuator may include driving coils disposed to face the first magnet and the second magnets.

The handshake correction apparatus may further include a lens support plate having the correction lens mounted thereon and that is driven perpendicularly to an optical axis, a base that supports the lens support plate to be movable, and a cover assembled above the base with the lens support plate interposed between the cover and the base.

The lens support plate may move together with the correction lens by a driving force of the actuator. The actuator may include a first driving unit and a second driving unit that respectively provide driving forces in the first and second axes directions.

The first driving unit and the second driving unit may be arranged as a pair in opposite directions with respect to the correction lens.

The first driving unit may include a first magnet and a driving coil respectively disposed on the lens support plate and the base so as to face each other, and the second driving unit may include a pair of second magnets and driving coils respectively disposed on the lens support plate and the base so as to face each other.

The Hall sensors may include a first hall sensor and second hall sensors disposed in the cover so as to respectively face the first magnet and the second magnets.

According to another aspect of the present invention, a handshake correction apparatus for correcting a shake of a camera includes a lens support plate having a correction lens mounted therein and magnets disposed at both sides of the correction lens, a base that supports the lens support plate to be movable, and having driving coils mounted to face the magnets, a cover assembled above the base with the lens support plate interposed between the cover and the base, and Hall sensors mounted on the cover and facing the magnets, wherein the Hall sensors include a pair disposed along a virtual extension line crossing the correction lens.

The Hall sensors may include a first Hall sensor that detects a displacement of the correction lens in a first axis direction, and second Hall sensors disposed as a pair along the virtual extension line and that detect a displacement of the correction lens in a second axis direction.

The magnets may include a first magnet disposed to face the first Hall sensor, wherein polarity of the first magnet is reversed in the first axis direction, and a pair of second magnets disposed to face the second Hall sensors, wherein polarities of the second magnets are reversed in the second axis direction.

A distance between the second Hall sensors and a center of the correction lens may be greater than a distance between the first Hall sensor and the center of the correction lens.

Output terminals having the same polarity of the second Hall sensors may be connected in parallel. Alternately, output terminals having different polarities of the second Hall sensors may be connected in series.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
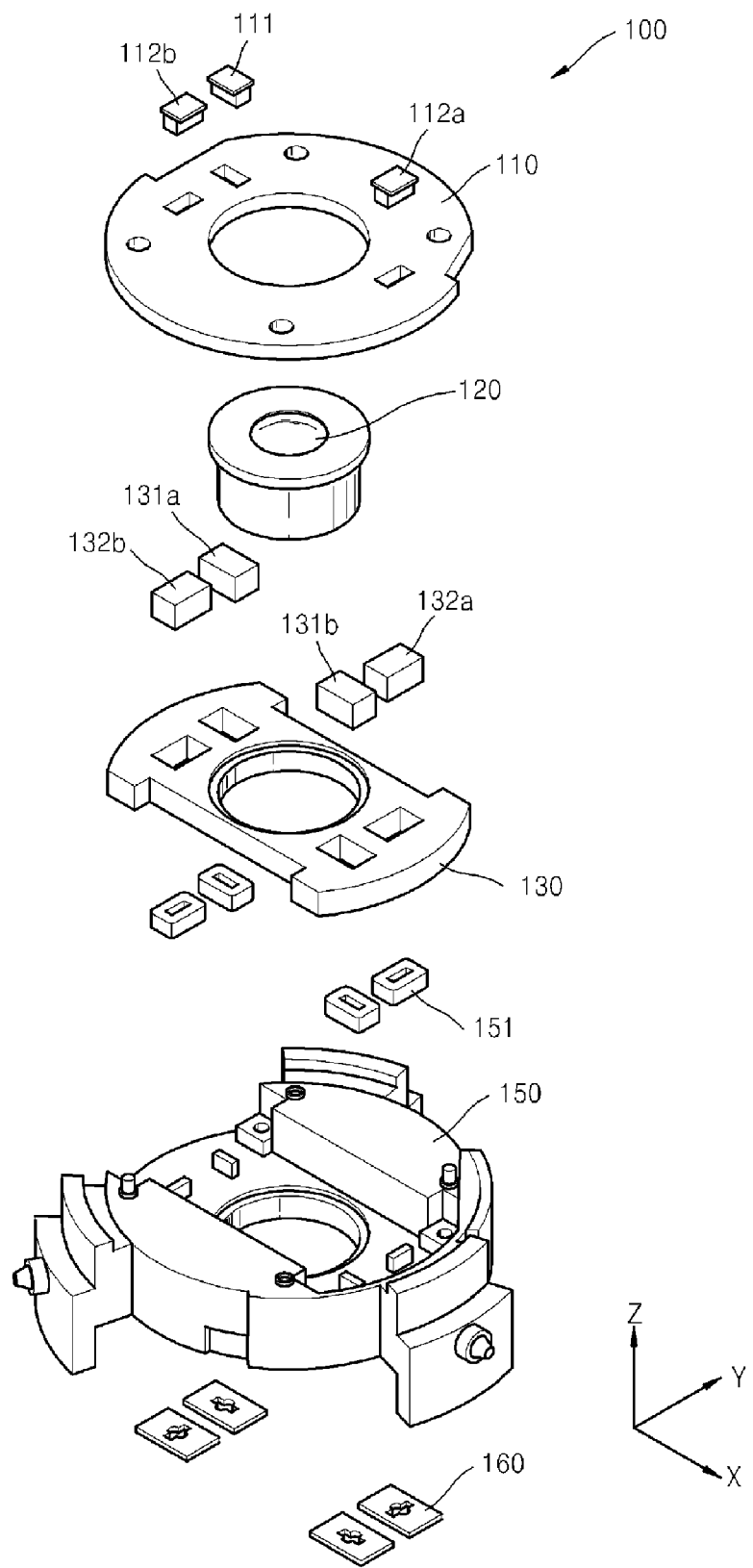
FIG. 1 is an exploded perspective view of a handshake correction apparatus according to an embodiment of the present invention.
Figure 2:
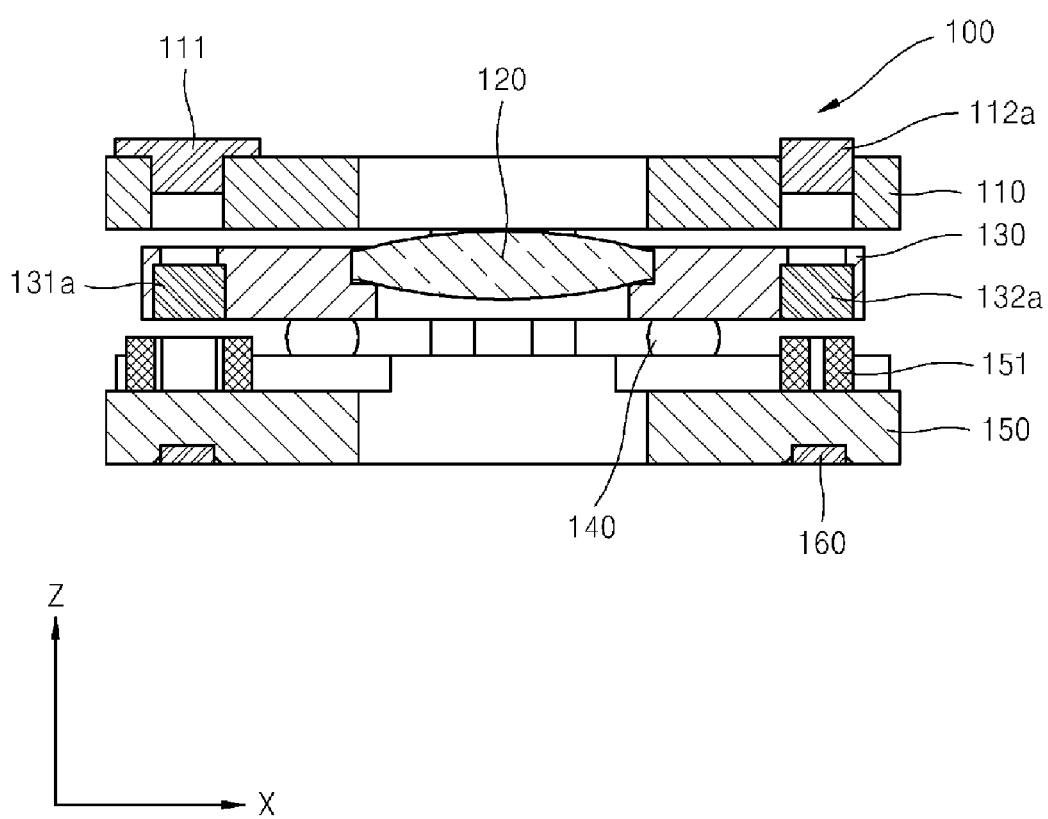
FIG. 2 is a vertical cross-sectional view of the handshake correction apparatus of FIG. 1.

Hereinafter, a handshake correction apparatus according to one or more embodiments of the present invention will be described in detail with reference to the attached drawings. FIG. 1 is an exploded perspective view of a handshake correction apparatus 100 according to an embodiment of the present invention. FIG. 2 is a vertical cross-sectional view of the handshake correction apparatus 100 of FIG. 1. The handshake correction apparatus 100 includes a correction lens 120, a lens support plate 130, and a base 150 for supporting the lens support plate 130. The correction lens 120 is mounted in the lens support plate 130.

A first pair of magnets 131a and 131b and a second pair of magnets 132a and 132b are respectively assembled at both side ends of the lens support plate 130, and driving coils 151 and yokes 160 are respectively assembled in above and below the base 150 so as to face the magnets 131a, 131b, 132a, and 132b. For example, the driving coils 151 and the yokes 160 may be respectively assembled on a top surface and a bottom surface of the base 150 so as to face the magnets 131a, 131b, 132a, and 132b.

Since the magnets 131a, 131b, 132a, and 132b and the driving coils 151 are assembled to face each other, electromagnetic interaction occurs therebetween, and thus the magnets 131a, 131b, 132a, and 132b and the driving coils 151 form a voice coil motor (VCM) actuator. Both ends of each of the driving coils 151 may be connected to a circuit substrate (not shown) for applying a control signal. The lens support plate 130 is driven in an X-Y axis plane perpendicular to an optical Z-axis, and performs a correction operation, according to the electromagnetic interaction between the magnets 131a, 131b, 132a, and 132b and the driving coils 151.

The magnets 131a, 131b, 132a, and 132b and the yokes 160 are assembled to face each other, and exert a magnetic force with respect to each other. Thus, the lens support plate 130 and the base 150 are moved close to each other by the magnetic force between the magnets 131a, 131b, 132a, and 132b and the yokes 160, and when a driving power is cut off, a center of each of the magnets 131a, 131b, 132a, and 132b is matched with a center of each of the yokes 160 so as to make the lens support plate 130 return to its original position. Meanwhile, the lens support plate 130 and the base 150 are disposed to face each other with ball bearings 140 (see FIG. 2) interposed therebetween. Thus, the lens support plate 130 supported by the base 150 via the ball bearings 140 moves in the X-Y axis plane.

A cover 110 may be disposed on a top part of the handshake correction apparatus 100. The cover 110 is assembled above the base 150 with the lens support plate 130 interposed between the cover 110 and the base 150. A plurality of Hall sensors 111, 112a, and 112b are assembled in the cover 110 so as to detect a position of the correction lens 120. The Hall sensors 111, 112a, and 112b are positioned to face the magnets 131a, 131b, 132a, and 132b, and sense a magnetic field change of the magnets 131a, 131b, 132a, and 132b, thereby detecting a displacement of the correction lens 120 that moves together with the magnets 131a, 131b, 132a, and 132b.

Figure 3:
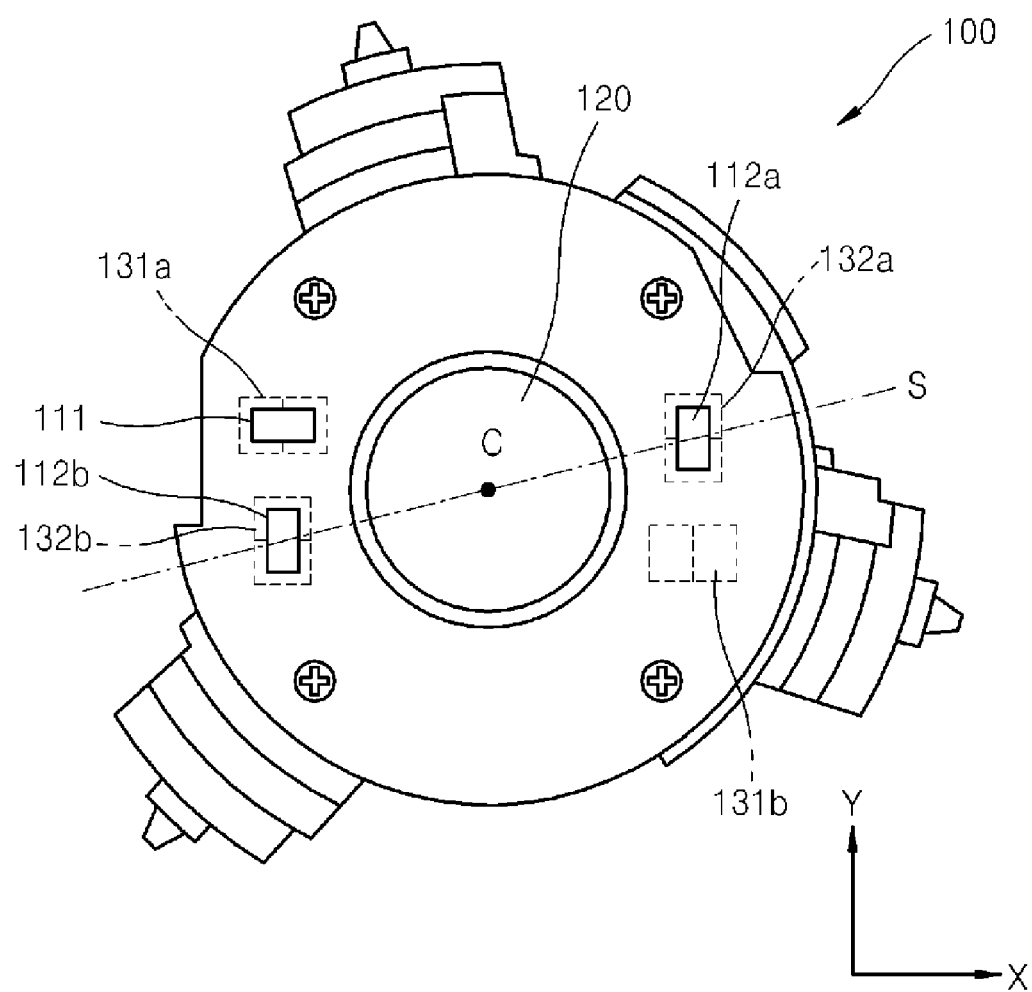
FIG. 3 is a top view of the handshake correction apparatus of FIG. 1, illustrating an arrangement of Hall sensors.

FIG. 3 is a top view of the handshake correction apparatus 100 of FIG. 1, illustrating the arrangement of the Hall sensors 111, 112a, and 112b. The correction lens 120 may be assembled in a center of the handshake correction apparatus 100. The first pair of magnets 131a and 131b and the second pair of magnets 132a and 132b may be arranged to be symmetrical to each other with respect to the correction lens 120. The first pair of magnets 131a and 131b provide a driving force in a first axis direction (X-axis direction), and are arrayed in such a manner that their polarities are opposite to each other along the first axis direction. The first pair of magnets 131a and 131b and two of the driving coils 151 constitute a first driving unit. The second pair of magnets 132a and 132b provide a driving force in a second axis direction (Y-axis direction) and are arrayed in such a manner that their polarities are opposite to each other along the second axis direction. The second pair of magnets 132a and 132b and the other driving coils 151 constitute a second driving unit. The first pair of magnets 131a and 131b and the second pair of magnets 132a and 132b may be arranged in opposite directions with respect to the correction lens 120.

The Hall sensors 111, 112a, and 112b are positioned to face the magnets 131a, 131b, 132a, and 132b in order to detect the position of the correction lens 120. The Hall sensors 111, 112a, and 112b detect displacement of the correction lens 120 in a single-axis direction. The Hall sensors 111, 112a, and 112b are divided into the first Hall sensor 111 that detects displacement of the correction lens 120 in the first axis direction (the X-axis direction), and the second Hall sensors 112a and 112b that are disposed as a pair in order to detect displacement of the correction lens 120 in the second axis direction (the Y-axis direction). The first Hall sensor 111 is disposed to face the first magnet 131a of which polarity is reversed along the first axis direction (the X-axis direction), and the pair of the second Hall sensors 112a and 112b are disposed to face the second magnets 132a and 132b of which polarities are reversed along the second axis direction (the Y-axis direction). In the present embodiment, the handshake correction apparatus 100 detects the displacement of the correction lens 120 by sensing magnetic field change in the first magnet 131a and the second magnets 132a and 132b constituting the VCM actuator. Therefore, it is not necessary to separately prepare magnets designed for an actuator and magnets designed to be sensed by the Hall sensors, thereby simplifying the structure of the handshake correction apparatus 100.

The pair of the second Hall sensors 112a and 112b are disposed along a virtual extension line S crossing the correction lens 120. It is possible to precisely detect the displacement of the correction lens 120 by disposing the pair of the second Hall sensors 112a and 112b at both sides of the correction lens 120. When movement of the lens support plate 130 has a translation component in the X-axis direction or the Y-axis direction, displacement of the magnets 131a, 131b, 132a, and 132b nearly matches the displacement of the correction lens 120. Thus, the Hall sensors 111, 112a, and 112b that sense the magnetic field change of the magnets 131a, 131b, 132a, and 132b may accurately detect the displacement of the correction lens 120. However, when the movement of the lens support plate 130 has a rotation component, the displacement of the magnets 131a, 131b, 132a, and 132b does not match the displacement of the correction lens 120, thus causing the HALL sensors 111, 112a, and 112b to erroneously detect the displacement of the correction lens 120.

Figure 4:
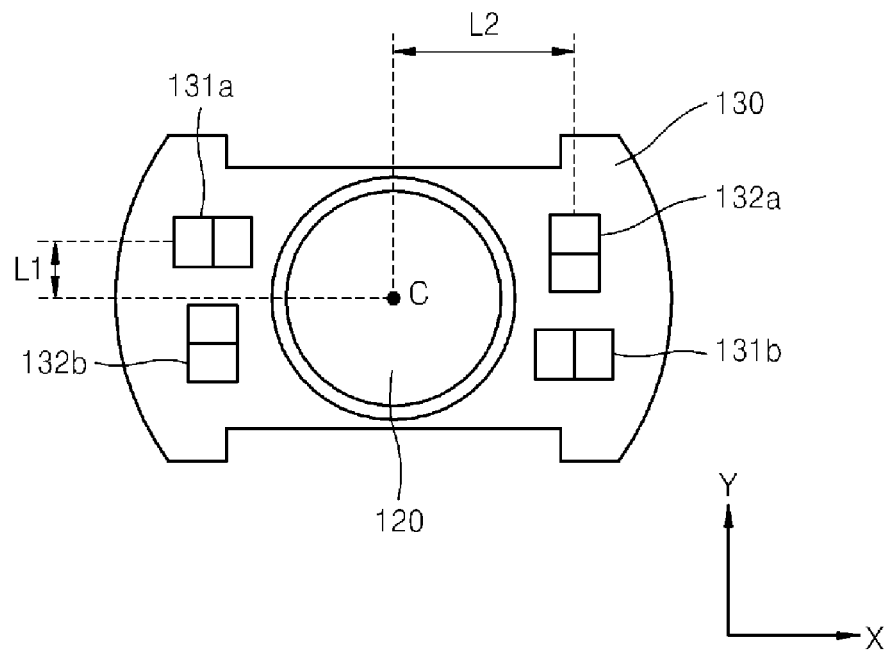
FIG. 4 is a plane view of a lens support plate of the handshake correction apparatus of FIG. 1.

FIG. 4 is a plane view of the lens support plate 130 of the handshake correction apparatus 100 of FIG. 1. Referring to FIG. 4, the relation between a first distance L1 from an optical center C of the correction lens 120 to the center of each of the first magnets 131a and 131b along the second axis direction (the Y-axis direction) and a second distance L2 from the optical center C of the correction lens 120 to the center of each of the second magnets 132a and 132b along the first axis direction (the X-axis direction) may be L1<L2. That is, the distance between the second magnets 132a and 132b and the correction lens 120 is greater than the distance between the first magnets 131a and 131b and the correction lens 120. For example, the first distance L1 and the second distance L2 may be respectively 2.0 µm and 6.2 µm.

Figure 5:
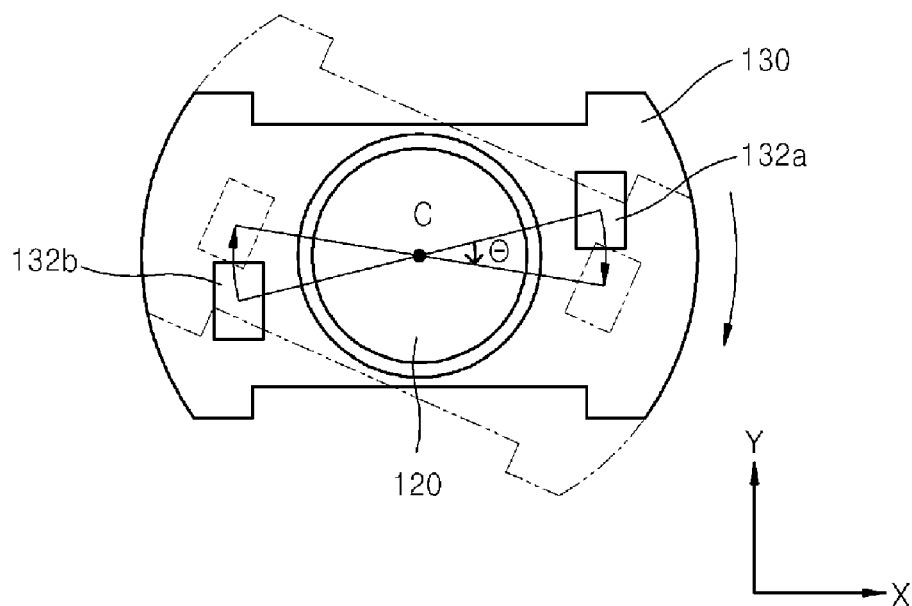
FIG. 5 is a diagram for describing an exemplary detection error of the Hall sensors, which may occur when the lens support plate rotates.

FIG. 5 is a diagram for describing an exemplary detection error of the Hall sensors 111, 112a, and 112b, which may occur when the lens support plate 130 rotates. As illustrated in FIG. 5, if the lens support plate 130 rotates by an angle θ, the displacement of each of the second magnets 132a and 132b does not match that of the correction lens 120, so that the Hall sensors 111, 112a, and 112b sensing a magnetic field change in the second magnets 132a and 132b may output an error value that does not precisely exhibit the displacement of the correction lens 120. In particular, since the distance L2 between the second magnets 132a and 132b and the correction lens 120 is greater than the distance L1 between the first magnets 131a and 131b and the correction lens 120 (refer to FIG. 4), the displacement of the second magnets 132a and 132b is more different from the displacement of the correction lens 120 than the displacement of the first magnets 131a and 131b, with respect to the same angle θ. Thus, in order to increase detection accuracy of the pair of the second Hall sensors 112a and 112b, it is efficient to dispose the second Hall sensors 112a and 112b as a pair. Furthermore, a positional error of the pair of the second Hall sensors 112a and 112b may be considerably improved by disposing the pair of the second Hall sensors 112a and 112b at both sides of the correction lens 120.

For example, when the lens support plate 130 rotates in a direction, the second magnet 132a at one side of the lens support plate 130 has negative directional displacement in the second axis direction (the Y-axis direction) while the second magnet 132b at the other side of the lens support plate 130 has positive directional displacement in the second axis direction (the Y-axis direction). The position of the correction lens 120 may be precisely detected by averaging outputs of the pair of the second Hall sensors 112a and 112b disposed at both sides of the correction lens 120.

Figure 6:
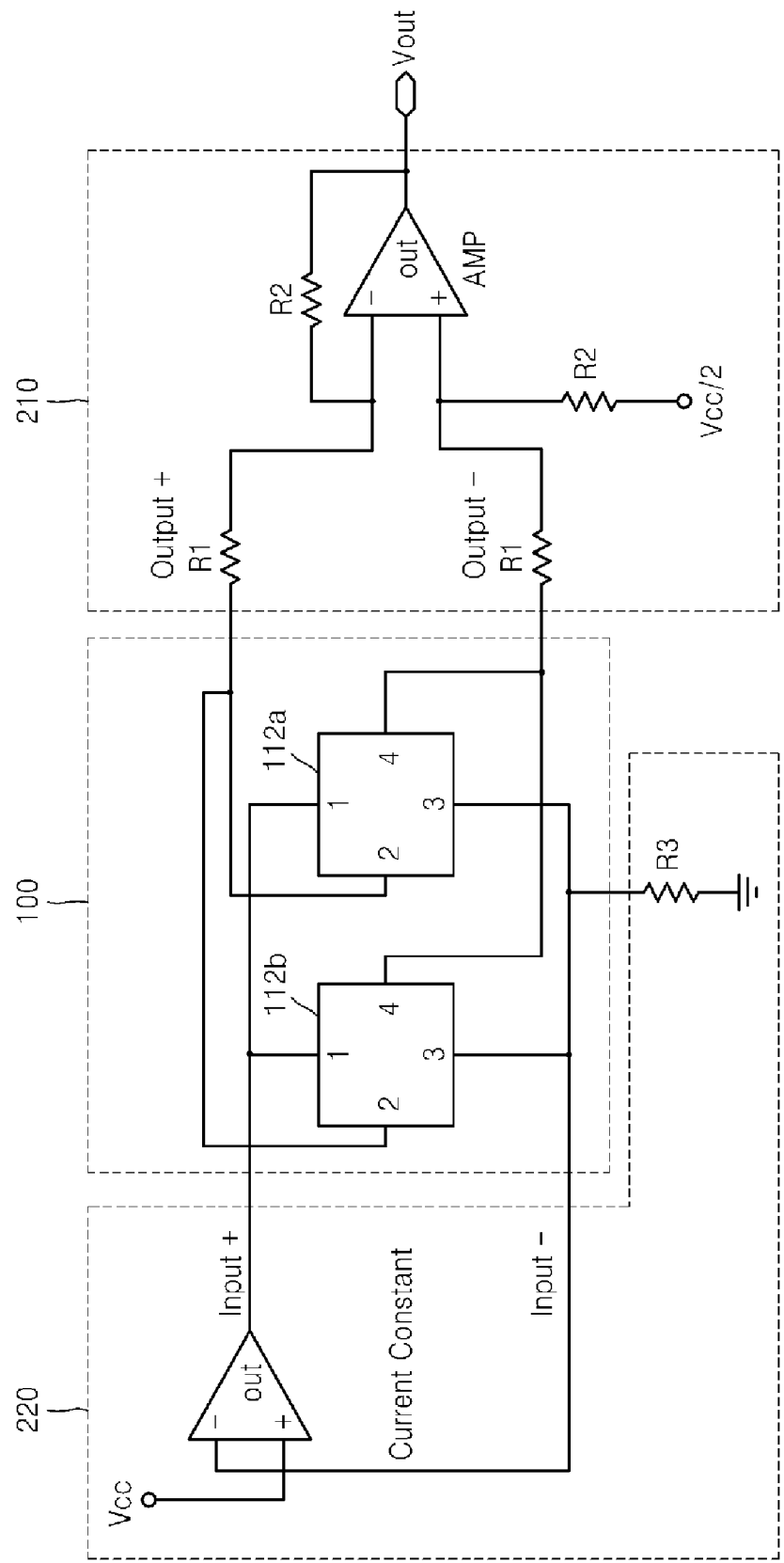
FIG. 6 is a circuit diagram for illustrating connection between a pair of second Hall sensors, according to an embodiment of the present invention.

FIG. 6 is a circuit diagram for illustrating connection between the pair of the second Hall sensors 112a and 112b, according to an embodiment of the present invention. The pair of the second Hall sensors 112a and 112b may be embodied as integrated circuits (ICs) having four-pin input/output terminals 1, 2, 3, and 4. The input terminals 1 and 3 and the output terminals 2 and 4 of the second Hall sensors 112a and 112b may be connected to circuit units, e.g. a differential amplifier circuit 210 and a constant current circuit 220, of a main body of a camera via a flexible printed circuit board (FPCB) (not shown). The FPCB relays signals between the pair of the second Hall sensors 112a and 112b included in the handshake correction apparatus 100 and the differential amplifier circuit 210 and the constant current circuit 220.

The pair of the second Hall sensors 112a and 112b are connected to each other in parallel, where the positive (+) output terminals 2 and 2 are connected to each other and the negative (−) output terminals 4 and 4 are connected to each other. A positive output signal Output+ and a negative output signal Output− of the pair of the second Hall sensors 112a and 112b may be input to the differential amplifier circuit 210 of the main body of the camera via the FPCB, and may be converted into positional coordinates of the correction lens 120 by performing a predetermined operation thereon. The input terminals 1 and 3 of the pair of the second Hall sensors 112a and 112b may be connected to the constant current circuit 220 via the FPCB in order to receive positive and negative input signals Input+ and Input−.

By connecting the output terminals 2 and 4 of the second Hall sensors 112a and 112b in parallel, the total number of positive and negative output signals Output+ and Output− may be the same as when only one Hall sensor is used. For example, two output signals Output+ and Output− may be achieved according to polarity. If output signals of Hall sensors that are disposed as a pair are individually received and processed, then the number of output signals are multiplied and the number of wirings in the FPCB are increased, thus increasing a width of the FPCB, changing a pin map of the FPCB, and complicating a control circuit for processing the output signals from the Hall sensors. Compared to the conventional art employing only one Hall sensor, the handshake correction apparatus 100 has a structure in which the second Hall sensors 112a and 112b are disposed as a pair to enhance a control performance and the output terminals 2 and 4 of the second Hall sensors 112a and 112b are connected to each other. Accordingly, it is possible to constantly maintain the total number of output signals Output+ and Output− without changing the design of the FPCB and an output signal processing circuit.

In another embodiment, the output terminals 2 and 4 of the second Hall sensors 112a and 112b may be serially connected. For example, the output terminals 2 and 4, whose polarities are opposite, may be connected to each other. In this case, the output signals Output+ and Output− are finally output from the second Hall sensors 112a and 112b, to be identical to when only one HALL sensor is used. For example, two output signals Output+ and Output− are achieved according to polarities, and thus, the design of the differential amplifier circuit 210 and the constant current circuit 220 is not required to be changed.

Table 1 below shows the result of an experiment comparing a control performance of a correction operation of the handshake correction apparatus 100 according to the embodiment of FIG. 1 with that of a conventional correction apparatus according to a comparative example in the same environment. The handshake correction apparatus 100 has a structure in which the second Hall sensors 112a and 112b are disposed as a pair at both sides of the correction lens 120, and the conventional correction apparatus has a structure in which one second Hall sensor is disposed at a side of a lens. In the experiment, a sign waveform having a frequency of 8 Hz, an amplitude of 100 mV and an offset of 750 mV was given as a vibration condition, and lens amplitude caused by the correction operation was measured. It was assumed that it is ideal that the same lens amplitude is obtained when the lens amplitude is repeated measured ten times under the same vibration conditions. In the experiment, the measuring results are collected and the standard deviation a thereof is calculated.

TABLE 1

|  | COMPARATIVE EXAMPLE | | PRESENT INVENTION | |
| --- | --- | --- | --- | --- |
|  | First axis direction (X-axis direction) | Second axis direction (Y-axis direction) | First axis direction (X-axis direction) | Second axis direction (Y-axis direction) |
| Test 1 | 34.26 μm | 62.65 μm | 39.69 μm | 41.82 μm |
| Test 2 | 39.06 μm | 33.11 μm | 39.18 μm | 40.26 μm |
| Test 3 | 39.11 μm | 29.60 μm | 37.98 μm | 42.06 μm |
| Test 4 | 39.35 μm | 33.90 μm | 37.84 μm | 41.65 μm |
| Test 5 | 41.25 μm | 32.20 μm | 40.91 μm | 41.55 μm |
| Test 6 | 38.70 μm | 35.50 μm | 38.39 μm | 41.35 μm |
| Test 7 | 38.70 μm | 27.30 μm | 38.76 μm | 42.14 μm |
| Test 8 | 38.71 μm | 29.10 μm | 38.40 μm | 41.08 μm |
| Test 9 | 39.58 μm | 21.90 μm | 39.49 μm | 41.16 μm |
| Test 10 | 40.20 μm | 44.00 μm | 38.37 μm | 41.80 μm |
| Average | 38.992 μm | 34.926 μm | 38.901 μm | 41.487 μm |
| Standard deviation | 1.829 μm | 11.319 μm | 0.935 μm | 0.556 μm |

Table 1 reveals that the standard deviation (0.556 μm) of the handshake correction apparatus 100 is approximately 1/20 times smaller than the standard deviation (11.319 μm) of the correction apparatus according to the comparative example in the second axis direction. In other words, by disposing the second Hall sensors 112a and 112b at both sides of the correction lens 120, the control performance of the handshake correction apparatus 100 in the second axis direction may be improved 5 times or more higher than that of the correction apparatus according to the comparative example. Also, in the first axis direction, the standard deviation (0.935 μm) of the handshake correction apparatus 100 is approximately 1/2 times smaller than the standard deviation (1.829 μm) of the correction apparatus according to the comparative example. Accordingly, improvement of the control performance in the second axis direction has an effect on the control performance in the first axis direction.

The handshake correction apparatus 100 may be disposed in a barrel structure of a camera. For example, the handshake correction apparatus 100 may be applied to both a retractable-type barrel structure having a barrel assembly that is inserted into or withdrawn from the camera according to a power-on/power-off status of the camera, and to a bent shape-type barrel structure having an optical system that is arrayed to be perpendicular to a direction in which light of a subject is incident.

In a handshake correction apparatus according to an embodiment, a pair of Hall sensors are disposed at both sides of a correction lens in order to reduce an error in position detection and the output terminals of the Hall sensors are connected in series or in parallel in order to constantly maintain the number of finally output signals. By doing so, it is not required to re-design signal wirings and an output signal processing circuit.

Figure 7:
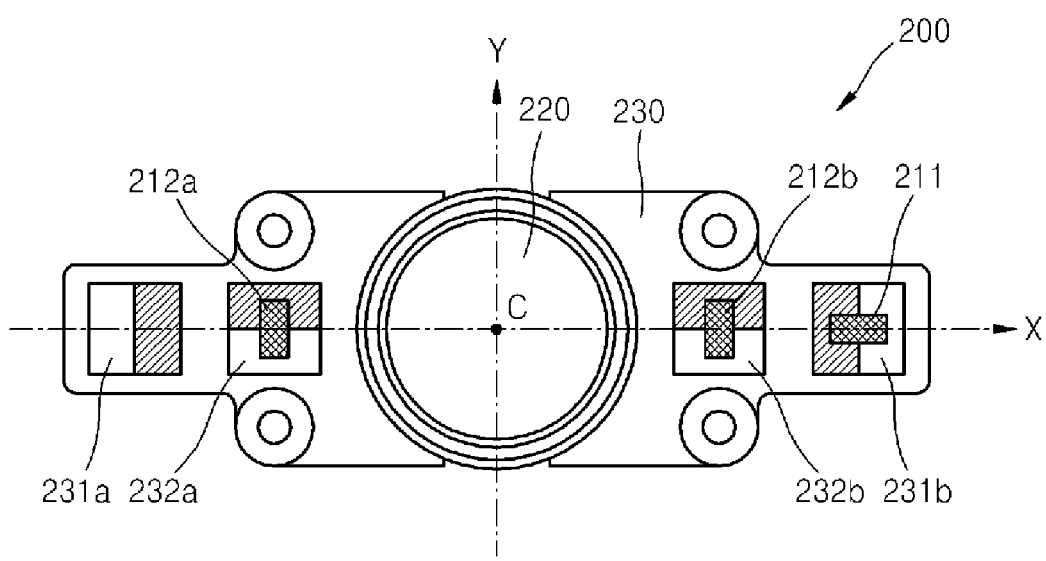
FIG. 7 is a diagram of a handshake correction apparatus according to another embodiment of the present invention, illustrating the arrangement of Hall sensors.

FIG. 7 is a diagram of a handshake correction apparatus 200 according to another embodiment of the present invention, illustrating the arrangement of Hall sensors 211, 212a, and 212b. Referring to FIG. 7, a correction lens 220 may be assembled in a center of a lens support plate 230, and a first pair of magnets 231a and 231b and a second pair of magnets 232a and 232b may be arranged to be symmetrical to each other with respect to the correction lens 220.

The first Hall sensor 211 and the second Hall sensors 212a and 212b are positioned to face the magnets 231b, 232a, and 232b in order to detect the position of the correction lens 220. The second Hall sensors 212a and 212b are arranged to form a pair on a virtual extension line in an X-axis crossing the correction lens 220. By arranging the second Hall sensors 212a and 212b at both sides of the correction lens 220, respectively, it is possible to almost accurately detect displacement of the correction lens 220.

Figure 8A:
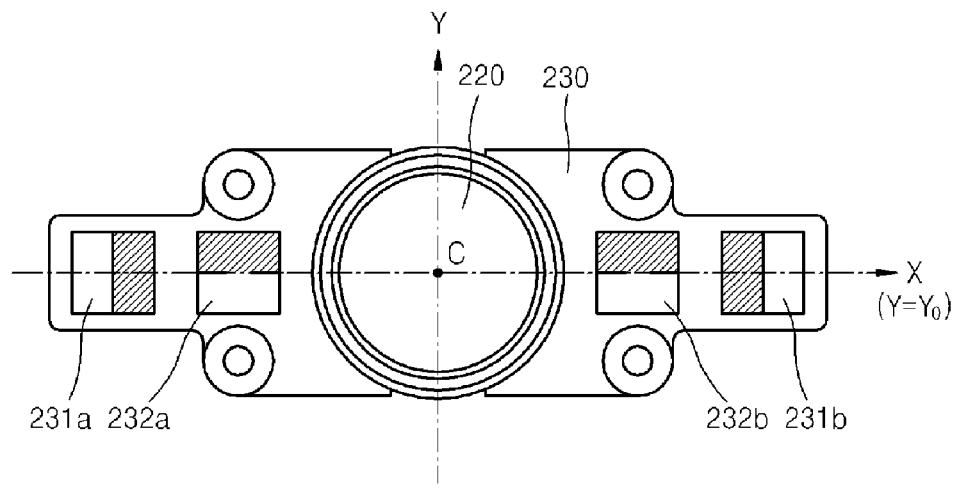
FIGS. 8A and 8B are diagrams for showing exemplary correction operations of a correction lens that approaches a target position based on position signals from Hall sensors, when movement of the correction lens has a translation component.
Figure 8B:
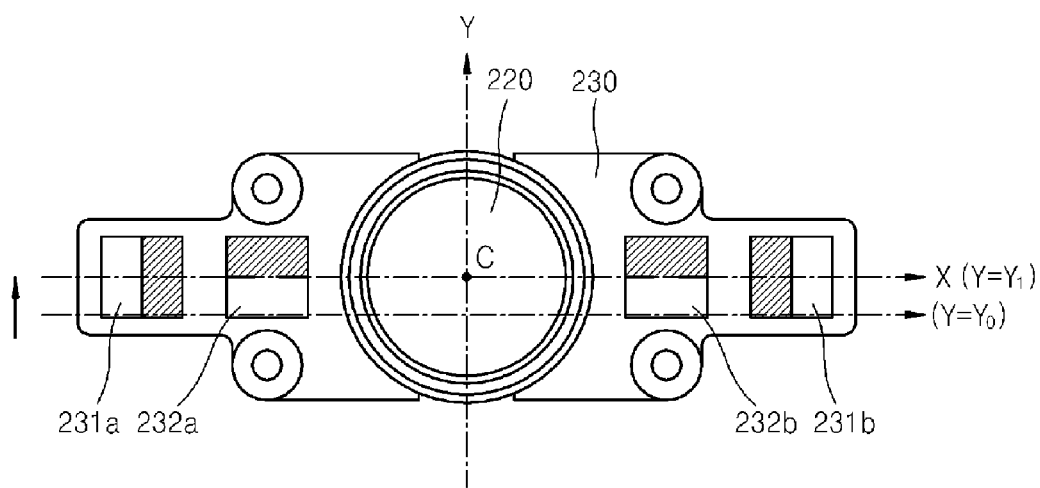
Figure 9A:
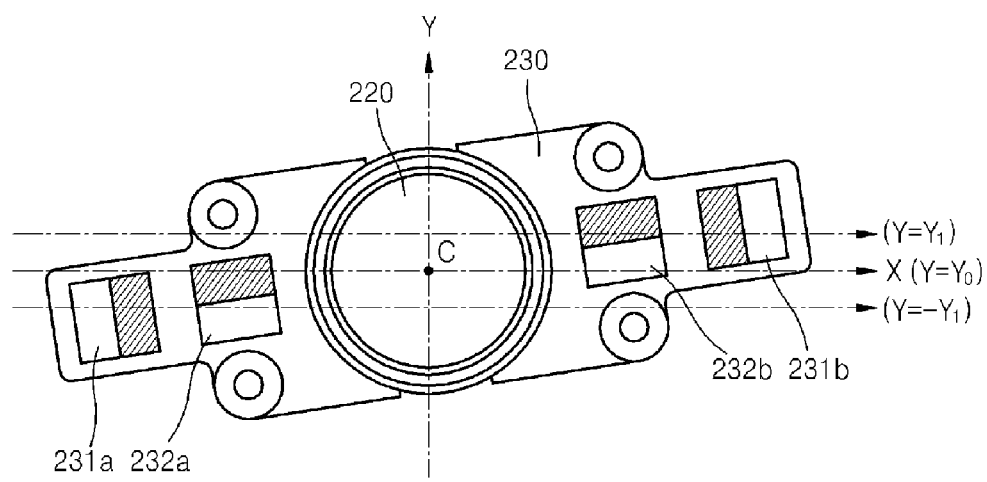
FIGS. 9A and 9B are diagrams for showing exemplary correction operations of a correction lens that approaches a target position based on position signals from Hall sensors, when movement of the correction lens has a rotation component in one direction.
Figure 9B:
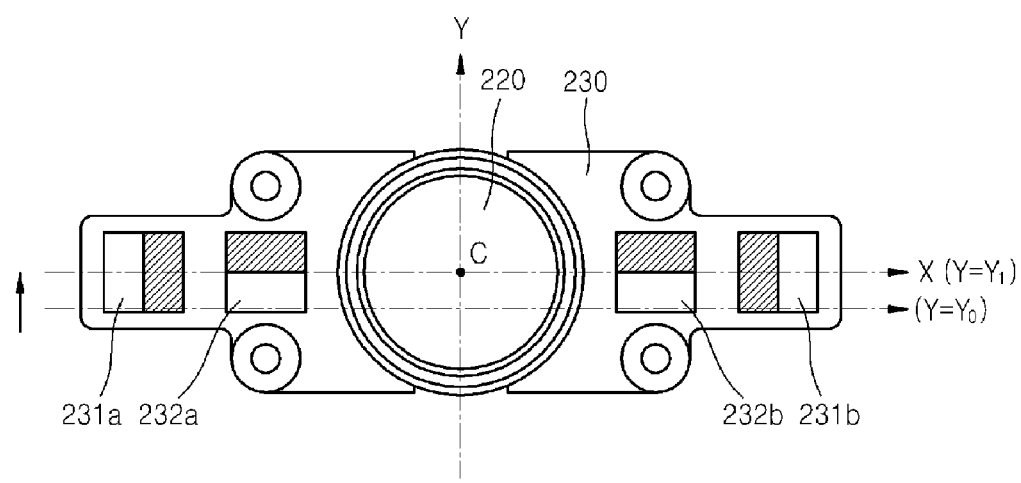
Figure 10A:
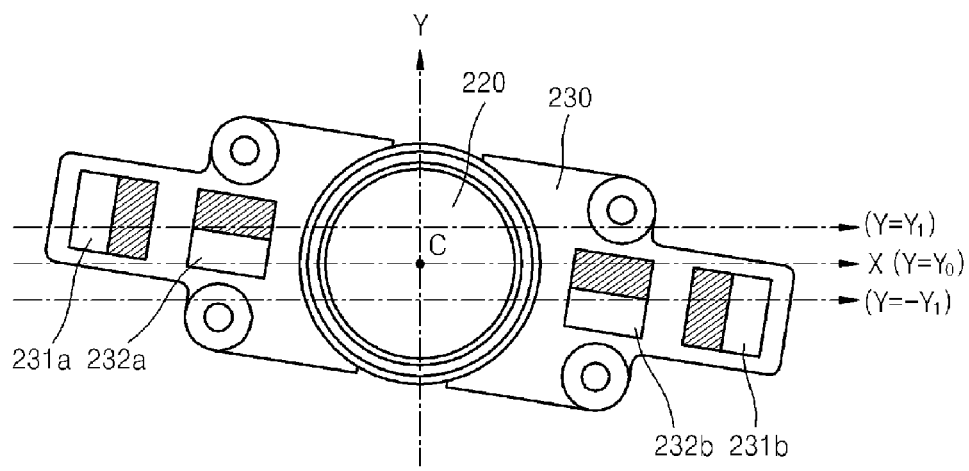
FIGS. 10A and 10B are diagrams for showing exemplary correction operations of a correction lens that approaches a target position based on position signals from Hall sensors, when movement of the correction lens has a rotation component in another direction.
Figure 10B:
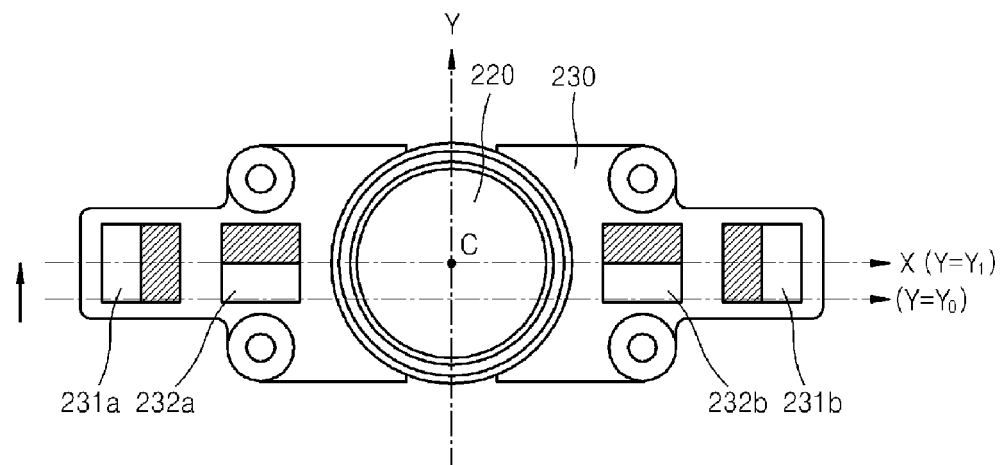

Hereinafter, FIGS. 8A through 10B are diagrams for showing correction operations of the correction lens 220, in a manner that the second Hall sensors 212a and 212b are arranged to correspond to each other at both sides of the correction lens 220 so that detection of displacement of the correction lens 220 may be increased. FIGS. 8A and 8B are diagrams for showing exemplary correction operations of the correction lens 220 that approaches a target position based on position signals from Hall sensors, when movement of the correction lens 220 has a translation component. FIGS. 9A and 9B are diagrams for showing exemplary correction operations of the correction lens 220 that approaches a target position based on position signals from Hall sensors, when movement of the correction lens 220 has a rotation component in one direction. FIGS. 10A and 10B are diagrams for showing exemplary correction operations of the correction lens 220 that approaches a target position based on position signals from Hall sensors, when movement of the correction lens 220 has a rotation component in another direction. In FIGS. 8A through 10B, the Hall sensors 211, 212a, and 212b are omitted for clarity.

In order to send the correction lens 220 from a current position (Y=Y0) to a target position (Y=Y1) according to a result of calculating the target position of the correction lens 220 for offset of a shake of a camera, as illustrated in FIGS. 8A and 8B, if movement of the correction lens 220 only has a translation component in a second axis direction (Y-axis direction) and does not have a rotation component, positions of the second magnets 232a and 232b and a position of the correction lens 220 match each other at a random time, and it is possible to control the correction lens 220 based on outputs from the second Hall sensors 212a and 212b detecting the second magnets 232a and 232b. That is, based on output signals from the second Hall sensors 212a and 212b, by maintaining a driving force in the second axis direction (Y-axis direction) until the correction lens 220 arrives at the target position (Y=Y1), the correction lens 220 may approach the target position (Y=Y1) (refer to FIG. 8B).

However, as illustrated in FIG. 9A, if the movement of the correction lens 220 has a rotation component, the positions of the second magnets 232a and 232b and the position of the correction lens 220 do not match each other along the second axis direction (Y-axis direction). Here, the Hall sensor 212b of the pair of the second Hall sensors 212a and 212b functions to detect that the correction lens 220 has arrived at the target position (Y=Y1), and at the same time, the Hall sensor 212a of the pair of the second Hall sensors 212a and 212b functions to detect that the correction lens 220 has not arrived yet to the target position (Y=Y1). In correspondence to this, as illustrated in FIG. 9B, a driving force to the Hall sensor 212b near the correction lens 220 arriving at the target position (Y=Y1) may be blocked whereas the driving force to the Hall sensor 212a near the correction lens 220 not arriving at the target position (Y=Y1) may be maintained, so that it is possible to accurately approach the correction lens 220 to an exact target position.

As illustrated in FIGS. 10A and 10B, although the movement of the correction lens 220 has a rotation component in an opposite direction compared to FIGS. 9A and 9B, it is possible to accurately approach the correction lens 220 to an exact target position by blocking a driving force to the Hall sensor 212a near the correction lens 220 arriving at the target position (Y=Y1) and by maintaining the driving force to the Hall sensor 212b near the correction lens 220 not arriving at the target position (Y=Y1). Accordingly, although an undesired rotation component is generated in the correction lens 220, by arranging the second Hall sensors 212a and 212b at both sides of the correction lens 220, respectively, it is possible to accurately approach the correction lens 220 to a target position based on output signals from the second Hall sensors 212a and 212b.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

It will be recognized that the terms "comprising," "including," and "having," as used herein, are specifically intended to be read as open-ended terms of art. The use of the terms "a" and "and" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

What is claimed is:

1. A handshake correction apparatus for correcting shake of a camera, the handshake correction apparatus comprising: sensors that detect a current position of a correction lens, wherein the sensors comprise a first Hall sensor that detects a first displacement of the correction lens along a first axis perpendicular to an optical axis of the correction lens, and second Hall sensors disposed as a pair along a virtual extension line crossing the correction lens and that detect a second displacement of the correction lens along a second axis perpendicular to the optical axis and the first axis;

an actuator that drives the correction lens in response to a control signal calculated according to the current position and a target position of the correction lens, the actuator comprising a first driving coil and second driving coils;

a first magnet disposed to face the first Hall sensor, wherein polarity of the first magnet is aligned along the first axis direction, wherein the first magnet is not disposed on either the first axis or the second axis, and the first driving coil is aligned with the first magnet and the first Hall sensor in the first and second axis directions; and a pair of second magnets disposed to face respective ones of the second Hall sensors, wherein polarities of the second magnets are aligned along the second axis direction, wherein the second magnets are disposed on opposite sides of the first axis and the second axis, and the second driving coils are aligned with respective ones of the second magnets and the second Hall sensors in the first and second axis directions.

2. The handshake correction apparatus of claim 1, wherein a first distance between the second Hall sensors and the second axis is greater than a second non-zero distance between the first Hall sensor and the first axis.

3. The handshake correction apparatus of claim 1, wherein output terminals of the second Hall sensors having the same polarity are connected in parallel.

4. The handshake correction apparatus of claim 1, wherein output terminals of the second Hall sensors having different polarities are connected in series.

5. The handshake correction apparatus of claim 1, further comprising:
a lens support plate having the correction lens mounted thereon and that is driven perpendicularly to the optical axis;
a base that moveably supports the lens support plate; and
a cover disposed above the base with the lens support plate interposed between the cover and the base.

6. The handshake correction apparatus of claim 5, wherein the lens support plate moves together with the correction lens responsive to a driving force of the actuator.

7. The handshake correction apparatus of claim 6, wherein the actuator further comprises a first driving unit and a second driving unit that respectively provide driving forces along the first and second axes.

8. The handshake correction apparatus of claim 7, wherein the first driving unit and the second driving unit are arranged as a pair in opposite directions with respect to the correction lens.

9. The handshake correction apparatus of claim 7, wherein:
the first driving unit comprises the first driving coil disposed on the base; and
the second driving unit comprises the second driving coils disposed on the base.

10. The handshake correction apparatus of claim 9, wherein the first Hall sensor and the second Hall sensors are disposed in the cover.

11. A handshake correction apparatus for correcting shake of a camera, the handshake correction apparatus comprising:

a lens support plate having a correction lens mounted therein and magnets disposed at both sides of the correction lens;

a base that supports the lens support plate to be movable, and having driving coils mounted to face the magnets;

a cover assembled above the base with the lens support plate interposed between the cover and the base; and sensors mounted on the cover and facing the magnets, wherein the sensors comprise a first Hall sensor that detects a displacement of the correction lens in a first axis direction, and second Hall sensors disposed as a pair along a virtual extension line and that detect a displacement of the correction lens in a second axis direction, and wherein the magnets comprise a first magnet disposed to face the first Hall sensor, wherein polarity of the first magnet is reversed in the first axis direction, and a pair of second magnets disposed to face the second Hall sensors, wherein polarities of the second magnets are reversed in the second axis direction.

12. The handshake correction apparatus of claim 11, wherein a distance between the second Hall sensors and a center of the correction lens is greater than a distance between the first Hall sensor and the center of the correction lens.

13. The handshake correction apparatus of claim 11, wherein output terminals of the second Hall sensors having the same polarity are connected in parallel.

14. The handshake correction apparatus of claim 11, wherein output terminals of the second Hall sensors having different polarities are connected in series.

* * * * *